US008719608B2

(12) United States Patent
Zhou et al.

(10) Patent No.: US 8,719,608 B2
(45) Date of Patent: May 6, 2014

(54) CONTROL APPARATUS FOR A COMPUTER, MAIN BOARD AND COMPUTER

(75) Inventors: Haoqiang Zhou, Beijing (CN); Quan Li, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 257 days.

(21) Appl. No.: 13/266,528

(22) PCT Filed: Apr. 26, 2010

(86) PCT No.: PCT/CN2010/072200
§ 371 (c)(1),
(2), (4) Date: Oct. 27, 2011

(87) PCT Pub. No.: WO2010/124607
PCT Pub. Date: Nov. 4, 2010

(65) Prior Publication Data
US 2012/0047381 A1    Feb. 23, 2012

(30) Foreign Application Priority Data
Apr. 27, 2009    (CN) .......................... 2009 1 0082962

(51) Int. Cl.
G06F 1/00    (2006.01)
G06F 1/32    (2006.01)

(52) U.S. Cl.
CPC .................................. *G06F 1/3203* (2013.01)
USPC .......................................... 713/323; 713/324

(58) Field of Classification Search
CPC ..................................................... G06F 1/3203
USPC ................................................ 713/300–340
See application file for complete search history.

(56) References Cited

U.S. PATENT DOCUMENTS 6,275,947 B1 *   8/2001   Wang ............................. 713/300
7,719,863 B2 *   5/2010   Yeh et al. ........................ 363/49

(Continued)

FOREIGN PATENT DOCUMENTS

CN           1920749 A      2/2007
CN           201000602      1/2008

(Continued)

OTHER PUBLICATIONS

PCT/CN2010/072200 International Search Report dated Jul. 23, 2010 (2 pages).

(Continued)

*Primary Examiner* — Raymond Phan
(74) *Attorney, Agent, or Firm* — Brinks Gilson & Lione; G. Peter Nichols

(57) ABSTRACT

The invention provides a control apparatus, a main board, and a computer herein, the control apparatus is applied in the computing device. The computing device includes a main board a standby power supply, and a switching means configured between the standby power supply and the at least one electronic element. The control apparatus includes a signal receiving module, a judging module for judging whether the computing device is in a turn-off mode according to the signal, and a controlling module. The standby power supply is connected with the main board through the control apparatus and the switching switch respectively, so that after the turn-off of the computer, the control apparatus switches off the connection between the standby power supply and the main board, to reduce the power consumption of the main board after the turn-off.

20 Claims, 3 Drawing Sheets

(56) References Cited

U.S. PATENT DOCUMENTS

| | | | |
|---|---|---|---|
| 8,330,292 B2* | 12/2012 | Wang et al. | 307/38 |
| 2004/0189341 A1* | 9/2004 | Liu | 324/771 |
| 2005/0207189 A1* | 9/2005 | Chen | 363/21.15 |
| 2007/0050649 A1 | 3/2007 | Zhang | |
| 2008/0168288 A1 | 7/2008 | Jia et al. | |
| 2009/0164819 A1* | 6/2009 | Berger et al. | 713/323 |
| 2010/0125743 A1 | 5/2010 | Yeh et al. | |

FOREIGN PATENT DOCUMENTS

| | | |
|---|---|---|
| CN | 101261532 | 9/2008 |
| CN | 101349938 A | 1/2009 |
| JP | 3150567 | 5/2009 |

OTHER PUBLICATIONS

PCT/CN2010/072200 International Preliminary Report on Patentability dated Nov. 1, 2011 (6 pages).

* cited by examiner

CONTROL APPARATUS FOR A COMPUTER, MAIN BOARD AND COMPUTER

BACKGROUND

The invention relates to a control apparatus, a main board and a computer.

In existing computer systems, a main power supply supplies power to the system in both of a running (S0) state and a CPU stopping operation (S1) state, while a standby power supply supplies power to the system in all of the running (S0) state, the CPU stopping operation (S1) state, a stopping operation (S3) state for all components except memory, a sleep state (S4) or a shut-down state (S5). That is, when the system is in the turn-off mode (S4 sleep state or S5 shut-down state), the elements (such as devices like SB, SIO, network card, etc.) connected with the standby power supply are still consuming power, so that the system still consumes some power in the turn-off mode.

SUMMARY

The object of the invention is to provide a control apparatus, a main board and a computer, to reduce the power consumption of the existing computer system in the turn-off mode. The control apparatus of the invention is applied in the computing device, wherein, said computing device comprising: a main board configured with a plurality of electric elements; a standby power supply, for supplying power to at least one electronic element of said plurality of electronic elements; a switching means, configured between said standby power supply and said at least one electronic element, said control apparatus comprising: a signal receiving module, for receiving a signal representing said computing device mode; a judging module, for judging whether said computing device is in a turn-off mode according to said signal; a controlling module, for switching off the connection between said main board and said standby power supply by said switching means when said judging module judges said computing device is in a turn-off module.

Said signal is a turn-on signal or a turn-off signal; if said signal receiving module receives a turn-off signal.

Said judging module judges the current mode of said computing devices is the turn-off mode according to said turn-off signal.

Said controlling module particularly includes: an enable signal writing unit, for writing a switch-off enable signal according to said turn-off mode; a controlling unit, for executing an operation for switching off the connection between the standby power supply and the main board according to said switch-off enable signal.

Said control apparatus is a logic circuit, and includes: a signal receiving pin, for receiving said turn-on signal or said turn-off signal; an enable signal transmitting pin, for transmitting an enable signal; a control signal transmitting pin, for transmitting a control signal; said signal receiving module, particularly used for receiving said turn-on signal or said turn-off signal from said signal receiving pin; said enable signal writing unit, used for writing said switch-off enable signal through said enable signal transmitting pin, according to said turn-off mode.

If said signal receiving module receives a turn-on signal, said judging module judges the current mode of said computing device is a turn-on mode according to said turn-on signal, and the enable signal writing unit of said controlling module is used for writing a switch-on enable signal according to said turn-on mode; and said controlling unit is used for executing an operation for switching on the connection between the standby power supply and the main board according to said switch-on enable signal.

The enable signal written by said enable signal writing unit is generated by a program embedded in the BIOS.

Said turn-off mode is the S4 sleep state or the S5 shut-down state.

The invention further provides a main board, including a control apparatus, said control apparatus comprising: a signal receiving module, for receiving a signal representing computing device mode; a judging module, for judging whether said computing device currently is in the turn-off mode according to said signal; a controlling module, for switching off the connection between said main board and said standby power supply when said judging module judges said computing device currently is in the turn-off mode.

Said signal is a turn-on signal or a turn-off signal; if said signal receiving module receives a turn-off signal, said judging module judges the current mode of said computing devices is the turn-off mode according to said turn-off signal;

Said controlling module particularly includes: an enable signal writing unit, for writing a switch-off enable signal according to said turn-off mode; a controlling unit, for executing an operation for switching off the connection between the standby power supply and the main board according to said switch-off enable signal.

Said control apparatus is a logic circuit, including: a signal receiving pin, for receiving said turn-on signal or said turn-off signal; an enable signal transmitting pin, for transmitting an enable signal; a control signal transmitting pin, for transmitting a control signal; said main board further including: a first switch, connected with said standby power supply, for switching off or switching on according to said control signal, to switch off or switch on the connection between said standby power supply and the main board; said signal receiving module, particularly used for receiving said turn-on signal or said turn-off signal from said signal receiving pin; said enable signal writing unit, used for writing said switch-off enable signal through said enable signal transmitting pin, according to said turn-off mode; said controlling unit, particularly used for generating a switch-off control signal, and transmitting said switch-off control signal to said first switch through said control signal transmitting pin; said first switch switches off according to said switch-off control signal, to switch off the connection between the standby power supply and the main board.

If said signal receiving module receives a turn-on signal, said judging module judges the current mode of said computing device is a turn-on mode according to said turn-on signal, and the enable signal writing unit of said controlling module is used for writing a switch-on enable signal according to said turn-on mode; and said controlling unit is used for executing an operation for switching on the connection between the standby power supply and the main board according to said switch-on enable signal.

The enable signal written by said enable signal writing unit is generated by a program embedded in the BIOS.

Said turn-off mode is the S4 sleep state or the S5 shut-down state.

The invention further provides a computer, including a control apparatus, said control apparatus comprising: a signal receiving module, for receiving a signal representing computing device mode; a judging module, for judging whether said computer system currently is in a turn-off mode according to said signal; a controlling module, for switching off the connection between the main board of the computer and the standby power supply when said judging module judges said computer system currently is in the turn-off mode.

Said signal is: a turn-on signal or a turn-off signal; if said signal receiving module receives the turn-off signal, said judging module judges the current mode of the system is turn-off mode according to said turn-off signal; said controlling module particularly includes: an enable signal writing unit, for writing a switch-off enable signal according to said turn-off mode; a controlling unit, for executing an operation for switching off the connection between the standby power supply and the main board according to said switch-off enable signal.

Said control apparatus is a logic circuit, including: a signal receiving pin, for receiving said turn-on signal or said turn-off signal; an enable signal transmitting pin, for transmitting an enable signal; a control signal transmitting pin, for transmitting a control signal; said main board further including: a first switch, connected with said standby power supply, for switching off or switching on according to said control signal, to switch off or switch on the connection between said standby power supply and the main board; said signal receiving module, particularly used for receiving said turn-on signal or said turn-off signal from said signal receiving pin; said enable signal writing unit, use for writing said switch-off enable signal through said enable signal transmitting pin, according to said turn-off mode; said controlling unit, particularly used for generating a switch-off control signal, and transmitting said switch-off control signal to said first switch through said control signal transmitting pin; said first switch switches off according to said switch-off control signal, to switch off the connection between the standby power supply and the main board.

If said signal receiving module receives a turn-on signal, said judging module judges the current mode of said system is a turn-on mode according to said turn-on signal, and the enable signal writing unit of said controlling module is used for writing a switch-on enable signal according to said turn-on mode; and said controlling unit is used for executing an operation for switching on the connection between the standby power supply and the main board according to said switch-on enable signal.

The enable signal written by said enable signal writing unit is generated by a program embedded in the BIOS.

Said turn-off mode is the S4 sleep state or the S5 shut-down state.

Compared to the existing technology, the invention has the following effects:

The invention connects the standby power supply with the main board through the control apparatus and the switching switch, and switches on or switches off the connection between the standby power supply and the main board by the control apparatus controlling the switch-on and switch-off states of the switching switch, so that after the turn-off of the computer, the control apparatus switches off the connection between the standby power supply and the main board, to realize the purpose for reducing the power consumption of the main board after the turn-off.

DETAILED DESCRIPTION

The embodiment of the invention reduces the power consumption in the turn-off mode by a control apparatus, mainly using the control apparatus to control the switch-on and off states of the switching switch connected between the standby power supply and the main board. By switching off the connection between the standby power supply and the devices such as SB, IO, LAN, etc., the purpose for reducing the power consumption of the main board is realized.

The embodiments of the invention will be further explained in detail in combination with the drawings.

Figure 1:
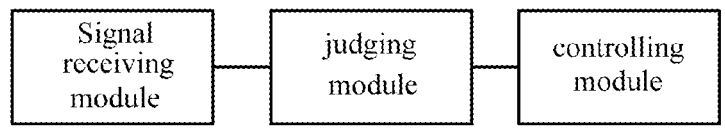
FIG. 1 is a structural schematic diagram of the control apparatus of the invention.

With reference to FIG. 1, FIG. 1 is a structural schematic diagram of the control apparatus of the invention, including:

a signal receiving module, for receiving a signal representing a computing device mode, the received signal being a turn-on signal or a turn-off signal;

a judging module, for judging whether the system currently is in the turn-off mode according to said signal. If the signal is a turn-off signal, the current mode of the system is determined as the turn-off mode. The turn-off mode of the embodiment is: the sleep (S4) state or the shut-down (S5) state. That is, if the signal is a turn-off signal, the system may be currently in the S4 state, or may be currently in the S5 state. Otherwise, if the signal is a turn-on signal, the current mode of the system is determined as the turn-on mode. The turn-on mode includes a network waking state.

A controlling module is used for switching off the connection between the main board and the standby power supply when said judging module judges the system currently is in the turn-off mode.

The control apparatus of the invention can be realized by an apparatus such as a microprocessor or a logic circuit or else which can generate control signals.

When the control apparatus of the invention is realized by a microprocessor, it can be realized directly by utilizing the structure as shown in FIG. 1.

When the control apparatus of the invention is realized by a logic circuit, if the judging module judges the current mode of the system is turn-off mode according to the turn-off signal, then the controlling module particularly includes:

an enable signal writing unit, for writing a switch-off enable signal according to said turn-off mode;

a controlling unit, for executing an operation for switching off the connection between the standby power supply and the main board according to said switch-off enable signal.

In addition of the turn-off signal, the signal further includes a turn-on signal, thus, if said judging module judges the system currently is in a turn-on mode according to the turn-on signal, the enable signal writing unit of said controlling module is used for writing a switch-on enable signal according to said turn-on mode.

And said controlling unit is used for executing an operation for switching on the connection between the standby power supply and the main board according to said switch-on enable signal.

Figure 2:
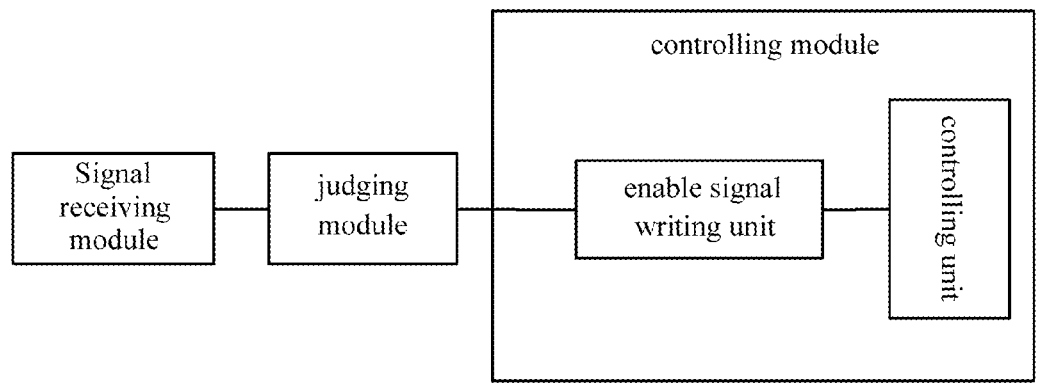
FIG. 2 is a structural schematic diagram of the logic circuit of an embodiment of the invention.

The structural schematic diagram including the structure of the logic circuit of an embodiment for processing the above turn-on signal and the turn-off signal is shown in FIG. 2.

The enable signal written by said enable signal writing unit is generated by a program embedded in the BIOS.

Figure 3:
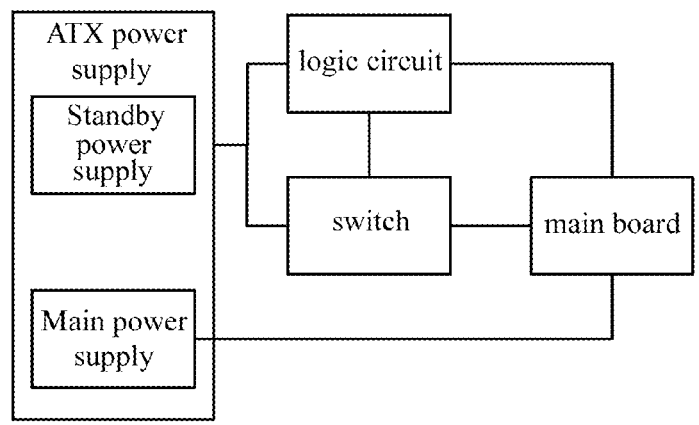
FIG. 3 is a structural schematic diagram of the connection between the control apparatus and the main board according to an embodiment of the invention.

With reference to FIG. 3, FIG. 3 is a structural schematic diagram of the connection between the logic circuit and the main board of the embodiment of the invention, and the FIG. 3 includes: a main power supply, a standby power supply, a main board, a logic circuit and a switch. The main power supply and the standby power supply both are parts of the ATX power supply. The main power supply is directly connected with the main board, for supplying power to the main board. The standby power supply is connected with the main board through the switch and the logic circuit respectively. A turn-on circuit and a turn-off circuit (not shown in drawings) on the main board are connected with the logic circuit respectively, for sending a turn-on signal and a turn-off signal to the logic circuit. For clearer representation, the logic circuit is configured on the main board, independent from the main board.

In the embodiment, the main power supply and the standby power supply in the ATX power supply can be integrated together, or can be physically and/or spatially separate. The person skilled in the art can appreciate that the main power supply and the standby power supply can operate independently.

After the logic circuit receives the turn-on signal, the logic circuit sends a switch-on control signal to the switch, to switch on the circuit, so as to connect the standby power supply and the main board. Then, after some logical processes, the logic circuit receives the turn-on signal sent from the main board, and after some logical processes, the logic circuit turns on the main power supply, and the main power supply supplies power to the main board.

When pressing a turn-off button, after the logic circuit receives the turn-off signal, it is determined whether the current mode is the sleep (S4) mode or the shut-down (S5) mode, if it is the S4 mode or the S5 mode, the logic circuit sends a switch-off control signal to the switch, to switch off the switch, in order to disconnect the standby power supply from the main board, so as to stop supplying power to devices on the main board connected with the standby power supply, which reduces the power consumption of the main board.

Figure 4:
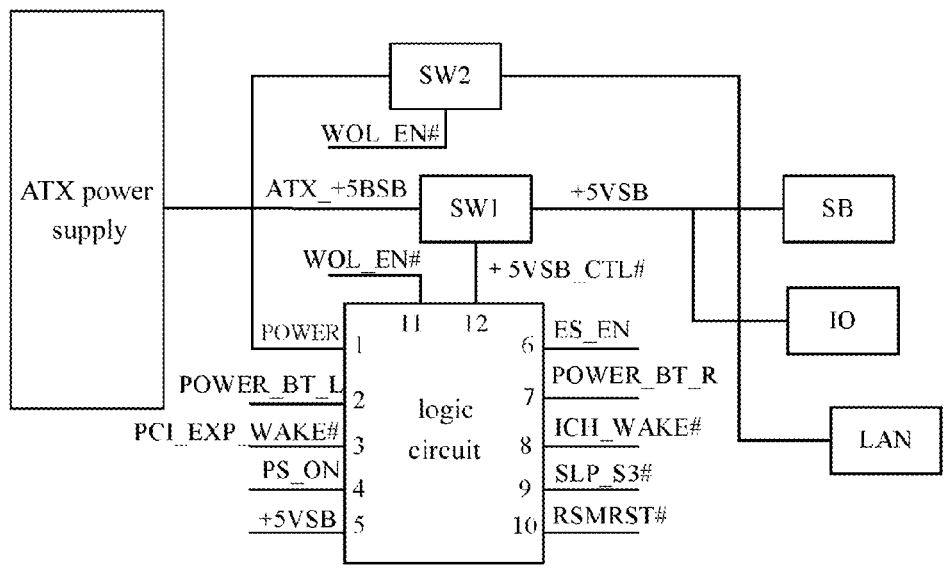
FIG. 4 is a structural schematic diagram of an embodiment of the logic circuit of the invention.

With reference to FIG. 4, FIG. 4 is a structural schematic diagram of an embodiment of the logic circuit of the invention. A south bridge (SB), an IO and so on are connected with the ATX power supply through a switch SW1. A network card is connected with the ATX power supply through a switch SW2. The SW1 and the SW2 are connected with pins 12 and 11 of the logic circuit respectively. A part of signals of the logic circuit are defined as shown in Table 1.

TABLE 1

| Signal | Definition |
| --- | --- |
| ES_EN | Energy saving enable signal, the high level of which is enable, the low level of which is disable, connected with the GPO of the IO or the south bridge, the power of which is supplied from a resume well. If the BIOS is set so that the power supply energy saving is required, then the GPO is set as high in S4 or S5 state; otherwise, the GPO is set as low. When ES_EN = 0, +5VSB_CTL# defaults as low the SW 1 is switched on, there is a default of +5VSB power supply on the main board; When ES_EN = 1, +5VSB_CTL# defaults as high, the SW 1 is switched off, there is a default of no +5VSB power supply on the main board; |
| POWER_BT_L | Power supply button input signal, the turn-on button is connected, the default is at high level, when the turn-on button is pressed, the default is at low high (ATX_+5VSB power supply). |
| POWER_BT_R | Power supply button signal input to the south bridge or the IO (+5VSB power supply) |
| +5VSB_CTL# | Signal for controlling the SW1 to be switched on or off, when 5VSB_CTL# = 1, the SW1 is switched off, +5VSB is not supplied; when 5VSB_CTL# = 0, the SW1 is switched on, +5VSB and ATX_+5VSB are connected. |
| PCI_EXP_WAKE# | Network awake input signal |
| ICH_WAKE# | Network awake signal input to the south bridge |
| +5VSB_CTL# | Control signal of the SW1 |
| WOL_EN# | Control signal of the SW2 |

The logical functions of +5VSB_CTL# and WOL_EN# are shown in the Table 2 below.

TABLE 2

| +5VSB_CTL#/WOL_EN# | SW1/SW2 |
| --- | --- |
| 1 | OFF (+5VSB OFF) (switched off) |
| 0 | ON (+5VSB ON) (switched on) |

Figure 5:
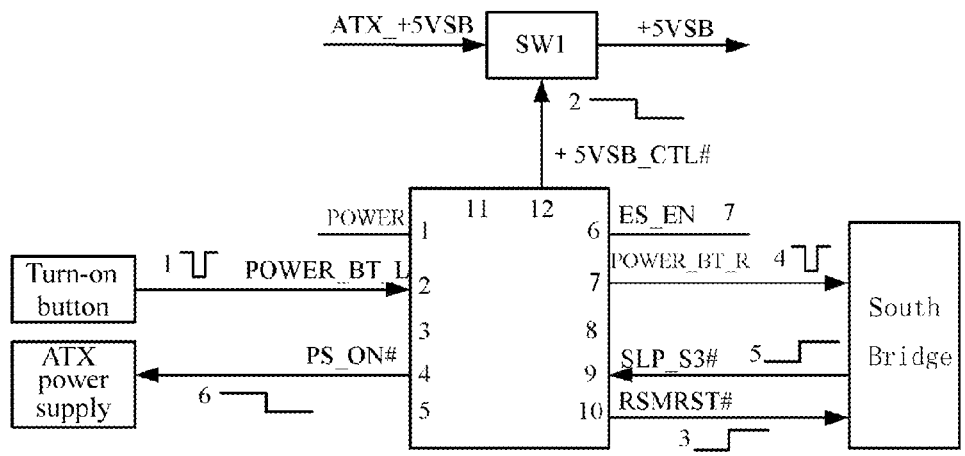
FIG. 5 is a timing schematic diagram of power-on when ES_EN=1 according to the invention.

With reference to FIG. 5, FIG. 5 is a timing schematic diagram of power-on when ES_EN=1 according to the invention. When ES_EN (Energy saving enable)=1, +5VSB_CTL# defaults as high, the SW 1 is switched off, there is a default of no +5VSB power supply on the main board; When turned-on, the logic circuit responds to the turn-on button signal POWER_BT_L, as follows:

1. The signal receiving module of the logic circuit receives a low pulse signal of POWER_BT_L, the judging module of the logic circuit judges the system is in the turn-on mode according to the low pulse signal of POWER_BT_L;

2. The controlling unit of the logic circuit pulls the +5VSB_CTL# signal to low, the SW1 is switched on, and there is +5VSB power supply on the main board;

3. After the controlling unit of the logic circuit detects +5VSB, it is delayed by 100 ms, pulling the RSMRST# signal to high;

4. The controlling unit of the logic circuit pulls the POWER_BT_R signal to low, notifying the south bridge or the IO;

5. After the south bridge receives the POWER_BT_R signal, through some logics, the SLP_S3# signal is pulled to high, notifying the controlling unit of the logic circuit;

6. The controlling unit of the logic circuit pulls the PS_ON# signal to low, the ATX power supply is turned on;

7. The enable writing signal writing unit of the controlling module writes a switch-on enable signal, i.e., writes the enable signal (ES_EN) 0 set by the BIOS, at this time, the POWER_BT_L and the POWER_BT_R are connected, and at this time, the function of the turn-on button is consistent with the existing system definition.

When ES_EN=0, the +5VSB_CTL# is low, the SW1 is switched on, the standby power supply of the ATX is connected with the standby power supply of the main board, supplying power to the south bridge and the IO;

Note: when first turned-on, the default value ES_EN=0. Then, after each turn-off, the BIOS will set ES_EN as 1, with the turn-off timing as follows.

Figure 6:
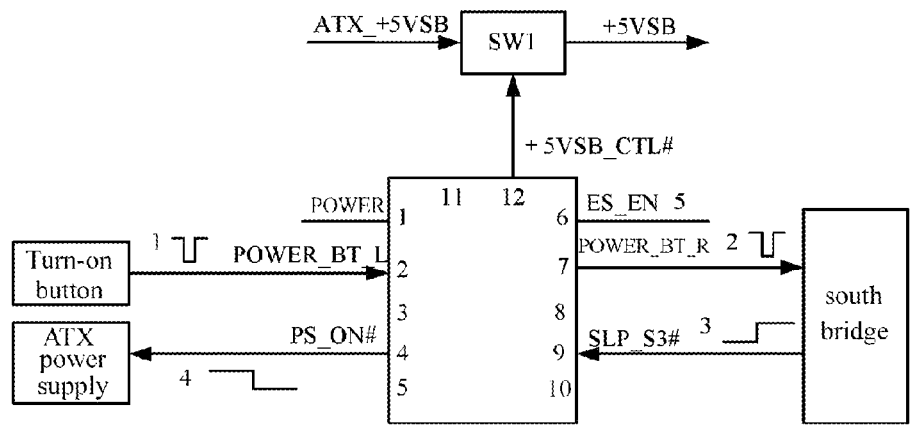
FIG. 6 is a timing schematic diagram of power-on when ES_EN=0 according to the invention.

With reference to FIG. 6, FIG. 6 is a timing schematic diagram of power-on when ES_EN=0 according to the invention. When ES_EN=0, +5VSB_CTL# defaults as low, the SW 1 is switched on, there is default +5VSB power supply on the main board, the power-on timing at this time is consistent with the existing system as follows:

1. The signal receiving module of the logic circuit receives a low pulse signal of POWER_BT_L, the judging module of the logic circuit judges the system is in turn-on mode according to the low pulse signal of POWER_BT_L;

2. The controlling unit of the logic circuit pulls the POWER_BT_R signal to low, notifying the south bridge or the IO;

3. The south bridge pulls the SLP_S3# signal is pulled to high, and notifies the controlling unit of the logic circuit;

4. The controlling unit of the logic circuit pulls the PS_ON# signal to low, the ATX power supply is turned on;

5. The enable writing signal writing unit of the controlling module writes a switch-on enable signal, i.e., writes the enable signal (ES_EN) 0 set by the BIOS, at this time, the POWER_BT_L and the POWER_BT_R are connected, and at this time, the function of the turn-on button is consistent with the existing system definition.

Since there is a network waking function in the modern computer application, the network connection supplied by a standby power supply is processed separately, which is divided into two running modes, i.e., network waking function and non network waking function.

When ES_EN=1 (the SW1 is switched off, the main board is not connected with the standby power supply), WOL_EN#=0, the SW2 is switched on, the ATX_5VSB and the LAN_5VSB are connected, and the system supports the network waking function. The power-on timing for waking will be explained as follows:

1. The signal receiving module of the logic circuit receives a low pulse signal of PCI_EXP_WAKE#, the judging module of the logic circuit judges the system as the network waking state according to the low pulse signal of PCI_EXP_WAKE#;

2. The controlling unit of the logic circuit pulls the +5VSB_CTL# signal to low, the SW1 is switched on, and there is +5VSB power supply on the main board;

3. After the controlling unit of the logic circuit detects +5VSB, it is delayed by 100 ms, pulling the RSMRST# signal to high;

4. The controlling unit of the logic circuit pulls the ICH_WAKE# signal to low, notifying the south bridge or the IO;

5. The south bridge pulls the SLP_S3# signal to high, and notifies the controlling unit of the logic circuit;

6. The controlling unit of the logic circuit pulls PS_ON# signal to low, the ATX power supply is turned on;

7. The enable writing signal writing unit of the controlling module writes a switch-on enable signal, i.e., writes the enable signal (ES_EN) 0 set by the BIOS, there is default +5VSB power supply on the main board, and the waking timing at this time is consistent with the waking timing of the existing system.

When ES_EN=0 (the SW1 is switched off, the main board is connected with the standby power supply), WOL_EN#=0, the timing for network waking will be explained as follows:

1. The signal receiving module of the logic circuit receives a low pulse of PCI_EXP_WAKE#, the judging module of the logic circuit judges the system as network waking state according to the low pulse signal of PCI_EXP_WAKE#;

2. The controlling unit of the logic circuit pulls the ICH_WAKE# signal to low, notifying the south bridge or the IO;

3. The south bridge pulls the SLP_S3# signal to high, and notifies the controlling unit of the logic circuit;

4. The controlling unit of the logic circuit pulls the PS_ON# signal to low, the ATX power supply is turned on;

5. The enable writing signal writing unit of the controlling module writes a switch-on enable signal, i.e., writes the enable signal (ES_EN) 0 set by BIOS.

When WOL_EN#=1, the SW2 is switched off, and the system does not support the network waking function.

Figure 7:
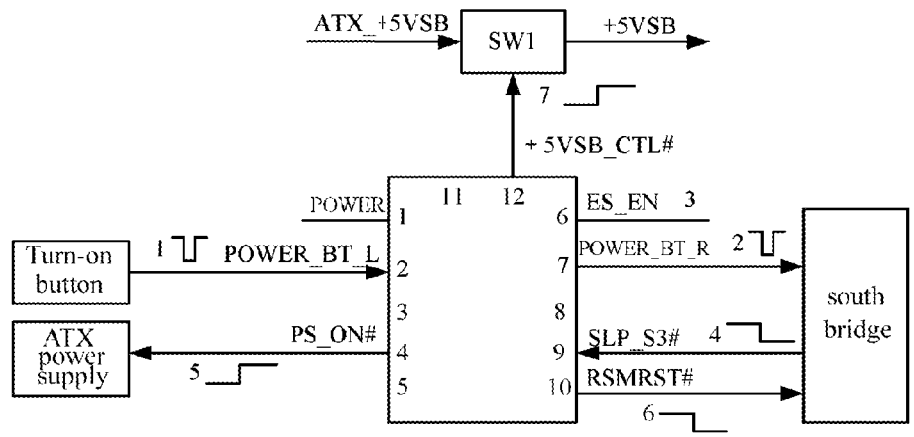
FIG. 7 is a timing schematic diagram of turn-off according to the invention.

With reference to FIG. 7, FIG. 7 is a timing schematic diagram of the turn-off of the invention, as follows:

1. The signal receiving module of the logic circuit receives a low pulse signal of POWER_BT_L;

The low pulse signal of POWER_BT_L is received by the signal receiving pin 2.

2. The controlling unit of the logic circuit pulls the POWER_BT_R signal to low, notifying the south bridge or the IO of the turn-off;

3. The judging module of the logic circuit judges the current mode of the system according to BIOS mode signal, the BIOS will generate the mode signal of the current system according to the POWER_BT_R signal, the judging module judges the mode of the current system according to the content of the mode signal;

When it is determined that the system is in the S3 state, the enable signal writing unit of the controlling module writes the switch-on enable signal through the enable signal transmitting pin 6, i.e., writes the enable signal (ES_EN) 0 set by the BIOS; if it is determined as the S4 or the S5 mode, the enable signal writing unit of the controlling module writes the switch-off enable signal through the enable signal transmitting pin 6, i.e., writes the enable signal (ES_EN) 1 set by the BIOS;

4. The south bridge pulls the SLP_S3# signal to low, and notifies the controlling unit of the logic circuit;

5. The controlling unit of the logic circuit pulls PS_ON# signal to high. The ATX main power supply is switched off;

6. If ES_EN=0, the timing ends, still remaining +5VSB power supply; if ES_EN=1, the controlling unit of the logic circuit pulls the RSMRST# signal to high, 7. If ES_EN=0, the timing ends, still remaining +5VSB power supply; if ES_EN=1, the controlling unit of the logic circuit pulls the +5VSB_CTL# signal to high, and the +5VSB_CTL# control signal (switch-off control signal) pulled to high is transmitted to the SW1 through the control signal transmitting pin 12, the SW1 is switched off according to the switch-off control signal, and the ATX_5VSB and the +5VSB are disconnected.

The apparatus of the invention can effectively reduce the power consumption of the main board in the turn-off mode. In the Energy star* 2007 classification /Limit, it is specified that the power consumption of the main board in the turn-off mode is <2 W (when not supporting the network waking WOL), while in the case of using the logic circuit to realize the same function, it can be realized that the power consumption of the main board is <0.1 W.

The above explanation is only with respect to the preferred embodiments of the invention, and it is to be noted that for the person skilled in the art, without departing from the principal of the invention, the modifications and the variations can be considered to be within the protection scope of the invention.

What is claimed is:

1. A control apparatus, applied in a computing device, said computing device comprising:
   a main board configured with a plurality of electronic elements;
   a standby power supply, for supplying power to at least one electronic element of said plurality of electronic elements;
   a switching means configured between said standby power supply and said at least one electronic element, wherein, said control apparatus comprising:
   a signal receiving module for receiving a signal representing a computing device mode;
   a judging module for judging whether said computing device is in a turn-off mode according to said signal;
   a controlling module for switching off a connection between said main board and said standby power supply by said switching means when said judging module judges said computing device is in the turn-off mode.

2. The control apparatus according to claim 1, wherein, said signal is:
   a turn-on signal or a turn-off signal;
   if said signal receiving module receives a turn-off signal, said judging module judges a current mode of said computing devices is in the turn-off mode according to said turn-off signal;
   said controlling module includes:
      an enable signal writing unit, for writing a switch-off enable signal according to said turn-off mode;
      a controlling unit, for executing an operation for switching off the connection between the standby power supply and the main board according to said switch-off enable signal.

3. The control apparatus according to claim 2, wherein said control apparatus is a logic circuit, including:
   a signal receiving pin, for receiving said turn-on signal or said turn-off signal;
   an enable signal transmitting pin, for transmitting an enable signal;
   a control signal transmitting pin, for transmitting a control signal;
   said signal receiving module is used for receiving said turn-on signal or said turn-off signal from said signal receiving pin;
   said enable signal writing unit is used for writing said switch-off enable signal through said enable signal transmitting pin, according to said turn-off mode.

4. The control apparatus according to claim 2, wherein if said signal receiving module receives a turn-on signal, said judging module judges the current mode of said computing device is a turn-on mode according to said turn-on signal, and the enable signal writing unit of said controlling module is used for writing a switch-on enable signal according to said turn-on mode; and said controlling unit is used for executing an operation for switching on the connection between the standby power supply and the main board according to said switch-on enable signal.

5. The control apparatus according to claim 2, wherein, said signal further includes a network waking signal;
   if said signal receiving module receives said network waking signal, said judging module judges the current mode of said computing device is a turn-on mode according to said network waking signal, and the enable signal writing unit of said controlling module is used for writing a switch-on enable signal according to said turn-on mode; and said controlling unit is used for executing an operation for switching on the connection between the standby power supply and the main board according to said switch-on enable signal.

6. A main board, comprising: a control apparatus, including:
   a signal receiving module, for receiving a signal representing a computing device mode;
   a judging module, for judging whether a computing device currently is in a turn-off mode according to said signal;
   a controlling module, for switching off a connection between said main board and a standby power supply when said judging module judges said computing device currently is in the turn-off mode.

7. The main board according to claim 6, wherein said signal is:
   a turn-on signal or a turn-off signal;
   if said signal receiving module receives a turn-off signal, said judging module judges the current mode of said computing device is turn-off mode according to said turn-off signal;
   said controlling module includes:
      an enable signal writing unit, for writing a switch-off enable signal according to said turn-off mode;
      a controlling unit, for executing an operation for switching off the connection between the standby power supply and the main board according to said switch-off enable signal.

8. The main board according to claim 7, wherein said control apparatus is a logic circuit, including:
   a signal receiving pin, for receiving said turn-on signal or said turn-off signal;
   an enable signal transmitting pin, for transmitting an enable signal; a control signal transmitting pin, for transmitting a control signal; said main board further including:
   a first switch, connected with said standby power supply, for switching off or switching on according to said control signal, to switch off or switch on the connection between said standby power supply and the main board;
   said signal receiving module is used for receiving said turn-on signal or said turn-off signal from said signal receiving pin;
   said enable signal writing unit is used for writing said switch-off enable signal through said enable signal transmitting pin, according to said turn-off mode;
   said controlling unit is used for generating a switch-off control signal, and transmitting said switch-off control signal to said first switch through said control signal transmitting pin;
   said first switch switches off according to said switch-off control signal, to switch off the connection between the standby power supply and the main board.

9. The main board according to claim 7, wherein if said signal receiving module receives a turn-on signal, said judging module judges the current mode of said computing device is a turn-on mode according to said turn-on signal, and the enable signal writing unit of said controlling module is used for writing a switch-on enable signal according to said turn-on mode; and said controlling unit is used for executing an operation for switching on the connection between the standby power supply and the main board according to said switch-on enabling signal.

10. The main board according to claim 7, wherein, said turn-off mode is a S4 sleep state or a S5 shut-down state.

11. A computer, including a control apparatus, said control apparatus comprising:
a signal receiving module for receiving a signal representing a computer device mode;
a judging module for judging whether said computer currently is in a turn-off mode according to said signal;
a controlling module for switching off a connection between a main board of the computer and a standby power supply when said judging module judges said computer currently is in the turn-off mode.

12. The computer according to claim 11, wherein said signal is:
a turn-on signal or a turn-off signal;
if said signal receiving module receives the turn-off signal, said judging module judges the current mode of the computer is in turn-off mode according to said turn-off signal;
said controlling module includes:
an enable signal writing unit, for writing a switch-off enable signal according to said turn-off mode;
a controlling unit, for executing an operation for switching off the connection between the standby power supply and the main board according to said switch-off enable signal.

13. The computer according to claim 12, wherein said control apparatus is a logic circuit, including:
a signal receiving pin, for receiving said turn-on signal or said turn-off signal;
an enable signal transmitting pin, for transmitting an enable signal;
a control signal transmitting pin, for transmitting a control signal;
said main board further including:
a first switch, connected with said standby power supply, for switching off or switching on according to said control signal, to switch off or switch on the connection between said standby power supply and the main board;
said signal receiving module is used for receiving said turn-on signal or said turn-off signal from said signal receiving pin;
said enable signal writing unit is used for writing said switch-off enable signal through said enable signal transmitting pin, according to said turn-off mode;
said controlling unit is used for generating a switch-off control signal, and transmitting said switch-off control signal to said first switch through said control signal transmitting pin;
said first switch switches off according to said switch-off control signal, to switch off the connection between the standby power supply and the main board.

14. The computer according to claim 11, wherein if said signal receiving module receives a turn-on signal, said judging module judges the current mode of said system is a turn-on mode according to said turn-on signal, and the enable signal writing unit of said controlling module is used for writing a switch-on enable signal according to said turn-on mode; and said controlling unit is used for executing an operation for switching on the connection between the standby power supply and the main board according to said switch-on enabling signal.

15. The computer according to claim 12 wherein, the enable signal written by said enable signal writing unit is generated by a program embedded in a BIOS.

16. The main board according to claim 7, wherein, said turn-off mode is a S4 sleep state or a S5 shut-down state.

17. The main board according to claim 7, wherein, said main board further includes: a second switch, connected with said standby power supply, for switching off or switching on the connection between said standby power supply and a network module of said main board; and when said first switch switches off, the connection between said standby power supply and said network module of said main board is allowed to be switched on by switching on said second switch.

18. The main board according to claim 7, wherein,
said signal further includes a network waking signal;
when said standby power supply is connected to said network module of said main board through said second switch, if said signal receiving module receives said network waking signal, said judging module judges the current mode of said computing device is a turn-on mode according to said network waking signal, and the enable signal writing unit of said controlling module is used for writing a switch-on enable signal to said turn-on mode; and
said controlling unit is used for executing an operation for switching on the connection between the standby power supply and the main board according to said switch-on enable signal.

19. The computer according to claim 13, wherein, said main board further includes:
a second switch, connected with said standby power supply, for switching off or switching on the connection between said standby power supply and a network module of said main board; and
when said first switch switches off, the connection between said standby power supply and said network module of said main board is allowed to be switched on by switching on said second switch.

20. The computer according to claim 14, wherein,
said signal further includes a network waking signal;
when said standby power supply is connected to said network module of said main board through said second switch, if said signal receiving module receives said network waking signal, said judging module judges the current mode of said computer is a turn-on mode according to said network waking signal, and the enable signal writing unit of said controlling module is used for writing a switch-on enable signal according to said turn-on mode; and
said controlling unit is used for executing an operation for switching on the connection between the standby power supply and the main board according to said switch-on enable signal.

\* \* \* \* \*

UNITED STATES PATENT AND TRADEMARK OFFICE
CERTIFICATE OF CORRECTION

PATENT NO. : 8,719,608 B2  
APPLICATION NO. : 13/266528  
DATED : May 6, 2014  
INVENTOR(S) : Haoqiang Zhou et al.

Page 1 of 1

It is certified that error appears in the above-identified patent and that said Letters Patent is hereby corrected as shown below:

On the Title Page

Left column, item (30), after "(CN)................2009 1" replace "0082962" with --0082962.5--.

Signed and Sealed this  
Ninth Day of September, 2014

Michelle K. Lee  
*Deputy Director of the United States Patent and Trademark Office*